March 28, 1967  R. L. REINERT ETAL  3,311,494
PROCESSES OF PRODUCING SMOOTH ADHERENT COATINGS
OF POLYTETRAFLUOROETHYLENE
Original Filed Dec. 7, 1964  2 Sheets-Sheet 1

INVENTORS
RAYMOND L. REINERT
CARL T. FLISS
BY
ATTYS.

March 28, 1967 R. L. REINERT ET AL 3,311,494
PROCESSES OF PRODUCING SMOOTH ADHERENT COATINGS
OF POLYTETRAFLUOROETHYLENE
Original Filed Dec. 7, 1964 2 Sheets-Sheet 2

INVENTORS.
RAYMOND L. REINERT
CARL T. FLISS
BY
Pringly, Baird Clayton,
Miller & Vogel ATTYS.

United States Patent Office 3,311,494
Patented Mar. 28, 1967

3,311,494
PROCESSES OF PRODUCING SMOOTH ADHERENT COATINGS OF POLYTETRAFLUOROETHYLENE
Raymond L. Reinert, South Elgin, and Carl T. Fliss, Glen Ellyn, Ill., assignors to General Electric Company, a corporation of New York
Original application Dec. 7, 1964, Ser. No. 416,582, now Patent No. 3,241,545, dated Mar. 22, 1966. Divided and this application Oct. 20, 1965, Ser. No. 498,694
6 Claims. (Cl. 117—75)

The present invention relates to processes of producing smooth adherent coatings of polytetrafluoroethylene upon substrates, and more particularly to processes of providing cooking devices with polytetrafluoroethylene protective coatings. This application comprises a division of the copending application of Raymond L. Reinert and Carl T. Fliss, Ser. No. 416,582, filed Dec. 7, 1964 now Patent No. 3,241,545, granted on March 22, 1966; which last-mentioned application comprises a continuation-in-part of the application of Raymond L. Reinert and Carl T. Fliss, Ser. No. 255,954, filed Feb. 4, 1963, now abandoned.

It is an object of the invention to provide an improved and altogether satisfactory process of producing polytetrafluoroethylene coated wall panels for cooking ovens of the character of that disclosed in U.S. Patent No. 3,145,289, granted on Aug. 18, 1964 to Myron Swetlitz; whereby the coatings facilitate ready cleaning of the panels after removal thereof from the oven and utilizing wash water containing a simple detergent.

In the Swetlitz patent, there is disclosed an oven of the household type provided with a cooking cavity in which there are arranged a number of removable panels disposed adjacent to a number of the walls of the oven liner defining the cooking cavity; which panels in their operative positions serve both as heat reflectors and as shields preventing soiling of the corresponding liner walls during the carrying out of broiling, roasting and other cooking operations in the cooking cavity; and which panels are readily removable for cleaning thereof by ordinary washing with water containing a simple detergent.

Fundamentally, these removable panels are formed of steel provided with bright chromium surfaces; however, the general suggestion is made that alternatively these panels may be coated with polytetrafluoroethylene or other organic soil-resistant material.

This suggestion is predicated upon the use of such coatings of polytetrafluoroethylene, silicone resins, etc., as have heretofore been applied to frypans, bakepans, and the like, to prevent the sticking thereto or the soiling thereof by the foods that are cooked therein. While such coatings have utility for the purpose mentioned, they are not permanent in character and they must be renewed after reasonable use of the utensils, as is well understood in the cooking and baking industry. Furthermore, these coatings are not only exceedingly variable with respect to thickness, containing many thin spots, but have outer surfaces which lack density and smoothness, so that they are subject to substantial discoloration thereof after use of the associated cooking device for only a short time interval. Moreover, previous attempts to eliminate thin spots by increasing the overall thickness of the individual coatings have been of no avail, since all such polytetrafluoroethylene coatings of any substantial thickness that have been previously produced are characterized by "mud-cracks" in the surfaces thereof, thereby rendering such coated panels far from satisfactory in the intended use thereof in a cooking cavity for the present purpose. In other words, such coatings as have been heretofore produced, and of any substantial thickness, have had exposed surfaces that were characterized by porosity engendered by lack of smoothness, by cracks, by contaminants, etc.; whereby these coatings were not highly impervious to moisture, to greases and to the other environmental elements of the cooking cavity; with the result that the panels were difficult to clean by washing and were discolored after a short time interval of use thereof in the oven cavity.

Accordingly, it is an object of the present invention to provide an improved process of producing a panel adapted to be removably supported in an operative position in an oven cavity adjacent to a wall thereof, wherein the panel comprises a metal body sheet, and a resinous coating tenaciously adhered to the side of the body sheet that is presented to the oven cavity when the panel occupies its operative position therein, the resinous coating consisting essentially of polytetrafluoroethylene and having a thickness of at least ½ mil and being characterized by a smooth and continuous and crack-free exposed surface that is highly impervious to moisture and substantially completely impervious to greases and to the other environmental elements of the oven cavity.

Another object of the invention is to provide an improved process of producing a panel of the character described, wherein the coating is subject to no blistering and to no substantial discoloration in use, may be readily cleaned by washing in water containing a simple detergent, and is completely chemically stable up to temperatures as high as 560° F.

Another and more general object of the invention is to provide an improved process of producing on a substrate a unified adherent coating of polytetrafluoroethylene having a smooth surface devoid of cracks and blemishes.

Further features of the invention pertain to the particular arrangement of the steps of the method, whereby the above-outlined and additional operating features thereof are attained.

The invention, both as to its organization and method of operation, together with further objects and advantages thereof, will best be understood by reference to the following specifications, taken in connection with the accompanying drawings, in which:

FIG. 4 is a fragmentary vertical sectional view of the oven, illustrating the support by the two side panels therein of a cooking device in the form of a bake pan, frypan, or the like;

Figure 1:
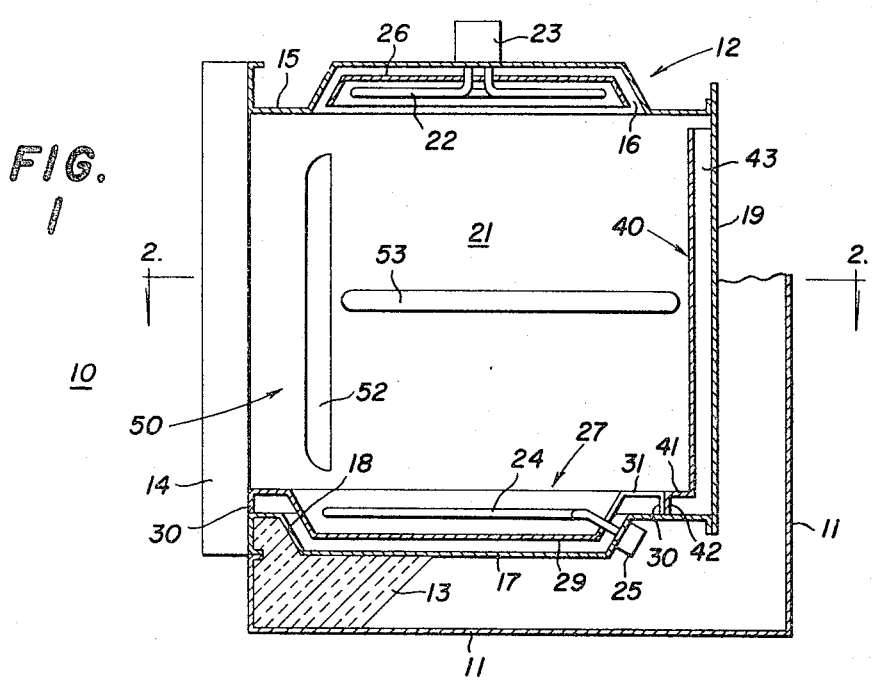
FIGURE 1 is a fragmentary vertical sectional view of an electric oven incorporating a plurality of removable panels that may be made in accordance with the process of the present invention.
Figure 2:
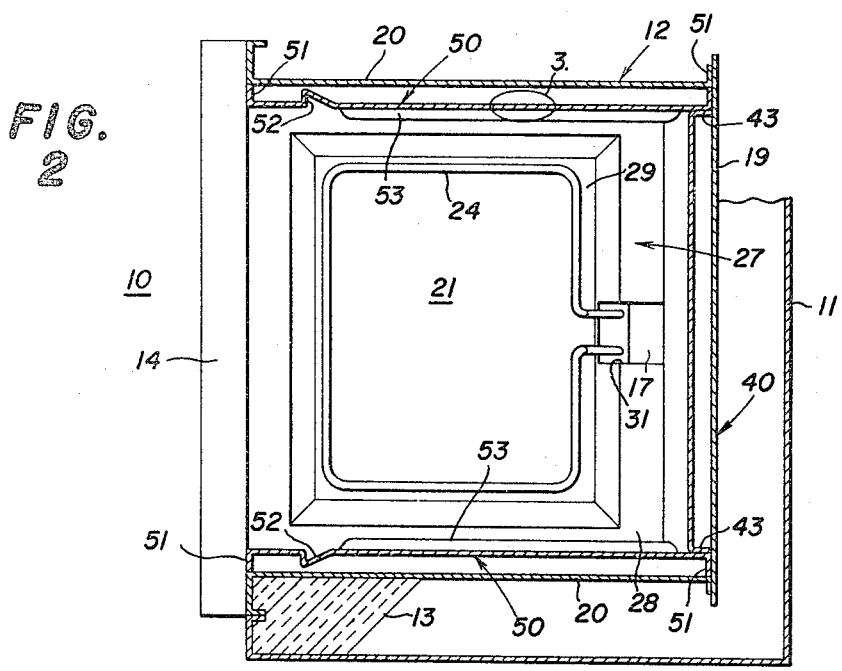
FIG. 2 is a fragmentary horizontal sectional view of the oven, this view being taken in the direction of the arrows along the line 2—2 in FIG. 1.

Referring now to FIGS. 1 and 2 of the drawings, the electric oven 10 there illustrated is of the household or home kitchen type, and essentially comprises a substantially box-shaped metal enclosing casing, a fragmentary portion of which is indicated at 11, and having a front opening. Housed within the casing 11 is a substantially box-shaped metal liner 12 and having a front opening, the liner 12 being suitably heat-insulated from the casing 11 by batts of fibrous glass, or the like, fragmentary portions of which are indicated at 13. The casing 11 and the liner 12 are normally formed of sheet steel; and the front openings thereinto are arranged substantially flush with each other at the front of the oven 10 and provided with a heat-insulated front door 14. The front door 14 may also be formed essentially of sheet steel and is ordinarily of hollow construction containing suitable heat-insulating material, such as batts of fibrous glass, not shown. The front door 14 is suitably hinged upon the casing 11 by facility, not shown; whereby the same is mounted for movements between open and closed positions with respect to the front opening into the liner 12 for the usual access purpose.

As illustrated, the liner 12 comprises a substantially rectangular top wall 15 having a substantially centrally disposed rectangular upwardly dished or formed cavity 16 therein, a substantially rectangular bottom wall 17 having a substantially centrally disposed rectangular downwardly dished or formed cavity 18 therein, a substantially flat rectangular rear wall 19, and a pair of substantially flat rectangular side walls 20. The top and bottom walls 15 and 17 are respectively disposed in generally parallel top and bottom planes, the top wall 15 occupying a superimposed position with respect to the bottom wall 17; the rear wall 19 is disposed in an upstanding position substantially parallel to the front opening into the liner 12; and the side walls 20 are disposed in upstanding substantially parallel positions with respect to each other; whereby the walls 15, 17, 19 and 20 cooperate to define within the liner 12 a substantially box-shaped oven cavity 21 accessible via the front opening thereinto when the front door 14 occupies its open position.

An upper or broil electric heating unit 22 of the sheathed resistance conductor type is removably arranged in the cavity 16 formed in the top liner wall 15 adjacent to the top of the oven cavity 21, the unit 22 being removably secured in place in an electric fixture 23 and electrically connected thereby to an exterior electric circuit network, not shown. Similarly, a lower or bake electric heating unit 24 of the sheathed resistance conductor type is removably arranged in the cavity 18 formed in the bottom liner wall 17 adjacent to the bottom of the oven cavity 21, the unit 24 being removably secured in place in an electrical fixture 25 and electrically connected thereby to the previously mentioned exterior electric circuit network, not shown.

The broil unit 22 is of the distributed type in that it includes convolutions or sections within its substantially rectangular boundary; and a reflector 26 is suitably removably secured in place within the cavity 16 and above the unit 22. The reflector 26 is formed of steel sheet and is provided with a polished lower surface carrying a bright mirror-like chromium layer or coating, not shown, whereby the reflector 26 protects the liner top wall 15 from high temperatures due to the absorption of radiant heat from the unit 22, and, of course, reflects the radiant heat mentioned back into the oven cavity 21.

The bake unit 24 is of the concentrated boundary type, since it merely comprises a substantially rectangular loop; and a combination pan-reflector 27 is removably supported by the bottom liner wall 17 and below the unit 24. The pan 27 comprises a rectangular top wall 28 that generally corresponds in configuration to that of the bottom liner wall 17, in that a substantially centrally disposed rectangular cavity 29 is formed in the pan top wall 28 that projects downwardly into the cavity 18 when the pan 27 occupies its normal supported position within the bottom of the oven cavity 21. The pan top wall 28 is provided with a downwardly directed rim 30 surrounding the perimeter thereof; which rim 30 directly engages the liner bottom wall 17 exteriorly of the cavity 18 formed therein, the front portion of the rim 30 being disposed immediately adjacent to the front of the liner bottom wall 17, the rear portion of the rim 30 being disposed somewhat forwardly of the liner rear wall 19, and the side portions of the rim 30 being disposed somewhat inwardly of the respective liner side walls 20. The rear central portion of the pan 27 has a slot 31 therein that accommodates the passage therethrough of the terminal ends of the bake unit 24, when the pan 27 occupies its normal position in the bottom of the oven cavity 21. Thus, when the pan 27 occupies its normal position in the bottom of the oven cavity 21, the pan top wall 28 is spaced above the liner bottom wall 17, the bake unit 24 is arranged within the cavity 29 provided in the pan 27 and spaced above the adjacent wall of the pan 27, and the bottom of the pan 27 adjacent to the cavity 29 therein is spaced above the bottom of the liner bottom wall 17 adjacent to the cavity 18 therein by virtue of the nested position of the central portion of the pan 27 and the central portion of the liner bottom wall 17. The pan 27 is formed of steel and is provided with a polished upper surface carrying a bright mirror-like chromium layer or coating, not shown; whereby the pan 26 in its normal position in the bottom of the oven cavity 21 protects the liner bottom wall 17 from high temperatures due to the absorption of radiant heat from the unit 24 and, of course, reflects the radiant heat mentioned back into the oven cavity 21.

A rear panel 40 is removably arranged in the oven cavity 21 in upstanding position immediately adjacent to the liner rear wall 19; which rear panel 40 is substantially rectangular carrying a forwardly offset ledge 41 at the bottom thereof that terminates in a downwardly projecting flange 42 that engages the linear bottom wall 17 and that also engages the rear portion of the pan rim 30 when the pan 27 occupies its normal position in the bottom of the oven cavity 21. Also, the rear panel 40 carries a pair of rearwardly directed flanges 53 that engage the liner rear wall 19. The rear panel 40 is suitably secured in place in upstanding position adjacent to the liner rear wall 19 and spaced somewhat forwardly with respect thereto by any conventional facility, not shown. The rear panel 40 comprises a steel body sheet of appropriate gauge, so that the same is of rigid self-supporting construction; and preferably, the opposite sides of the body sheet carry thin layers or coatings of aluminum, such material being known commercially as "aluminated steel sheet." Also, the front side of the body sheet of the rear panel 40 carries a layer or coating of substantial thickness of polytetrafluoroethylene, thereby to render the rear panel 40 soil-resistant and easily cleaned after removal thereof from the oven cavity 21, as explained more fully hereinafter.

A pair of side panels 50 are removably arranged in the oven cavity 21 in upstanding positions respectively immediately adjacent to the liner side walls 20; the side panels 50 being identical, and each thereof being substantially rectangular and carrying an outwardly directed rim 51 surrounding the perimeter thereof and engaging the adjacent liner side wall 20. Each of the said panels 50 is suitably secured in place in upstanding position adjacent to the associated liner side wall 20 and spaced somewhat inwardly with respect thereto by conventional facility, not shown. Further, each of the side panels 50 is provided with an upstanding recess 52 therein disposed adjacent to the front thereof; which recess 52 constitutes a finger-grasp recess to facilitate sliding of the side panel 50 forwardly out of the front opening into the oven cavity 21, when it is desirable to remove the side panel 50 therefrom. Finally, the side panels 50 are provided with inwardly directed and horizontally aligned ridges or projections 53 that are adapted for use in supporting another removable cooking device in the oven cavity 21, as explained more fully hereinafter.

Each of the side panels 50 (FIG. 3) comprises a steel body sheet 53 of appropriate gauge, so that the same is of rigid self-supporting construction; and preferably, the opposite sides of the body sheet 53 have coatings 54a and 54b of aluminum, such material being known commercially as "aluminized steel sheet." Also, in each side panel 50, the inner side of the body sheet 53 carries upon the aluminum layer 54b a layer or coating 55 of substantial thickness of polytetrafuoroethylene characterized by an exterior surface that is dense and exceedingly smooth, whereby the side panel 50 is soil-resistant and easily cleaned after removal thereof from the oven cavity 21, as explained more fully below.

Figure 3:
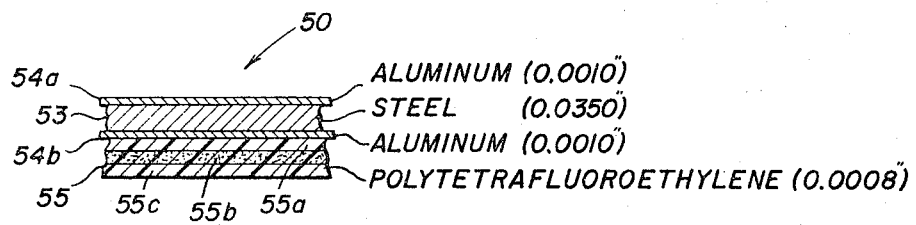
FIG. 3 is a greatly enlarged development of one of the panels in the area of the circle designated 3 in FIG. 2.

In a constructional example of the side panel 50, as illustrated in FIG. 3, the steel body sheet 53 may have a thickness of about 0.0350 inch, and the outer and inner layers of aluminum 54a and 54b, may each have a thickness of about 0.0010 inch. The polytetrafluoroethylene coating 55 carried by the inner aluminum layer 54b has a substantial thickness in terms of such organic resinous coatings, and in the range ½ mil to 1½ mils. Specifically, the coating 55 has a substantially uniform thickness and is altogether devoid of thin spots, the minimum thickness thereof being ½ mil; and preferably, the coating 55 has a thickness of at least about 0.8 mil.

At this point it is noted that the basic construction of the rear panel 40 is the same as that of each of the side panels 50 with respect to the structure thereof concerning the steel body sheet, the inner and outer aluminum layers, and the inner resinous coating; whereby the structural arrangement of the side panel 50, as shown in FIG. 3, is applicable to the rear panel 40.

Thus, each of the panels 40 and 50 comprises the steel body sheet carrying the outer and inner aluminum layers securely bonded to the corresponding sides thereof, together with the resinous coating tenaciously adhered to the inner aluminum layer that is present to the oven cavity when the panel occupies its operative position therein. The resinous coating has a minimum thickness of at least about ½ mil and consists essentially of polytetrafluoroethylene and is characterized by a smooth and continuous and crack-free exposed surface that is highly impervious to moisture and substantially completely impervious to greases and to the other environmental elements of the oven cavity. This resinous coating is subject to no blistering and to no substantial discoloration in use, and may be readily cleaned by washing in water containing a simple detergent, following removal of the panel from the oven cavity, in the general manner of washing a cookie sheet. Furthermore, this resinous coating is completely chemically stable up to temperatures as high as 560° F.

Also, it is pointed out that this resinous coating may incorporate a suitable color pigment imparting a desired color thereto; whereby the removable panels 40 and 50 may constitute a part of the decor of the oven 10, thereby to improve or enhance the appearance thereof and to facilitate the carrying out of a color scheme or decorating plan in the kitchen in which the oven 10 is arranged.

Reverting to the construction and arrangement of the oven 10, the provision of the panels 40 and 50 within the oven cavity 21 materially reduce the normal operating temperatures of the associated liner rear wall 19 and liner side walls 20; thereby to minimize the thickness of the heat-insulating batts 13 required between these liner walls and the corresponding casing walls; whereby the panels 40 and 50 effect a corresponding increase in the volume of the oven cavity 21 with a casing 11 of fixed dimensions. Moreover, the panels 40 and 50 prevent soiling of the corresponding walls 19 and 20 of the liner 12; thereby minimizing the work required by the cook in maintaining the oven cavity 21 in clean attractive condition. Further, the panels 40 and 50 may be readily wiped-off in place in the oven cavity 21, without removal thereof, for the purpose of eliminating light soil therefrom. Further, the panels 40 and 50 may be readily removed from the oven cavity 21 and washed in water in the manner of a cookie sheet, or the like; and thereafter, the panels 40 and 50 are returned into their normal operative positions in the oven cavity 21.

Of course, the pan 27 may be removed from the oven cavity 21, washed, and then returned into its operative position in the oven cavity, in an obvious manner.

Figure 4:
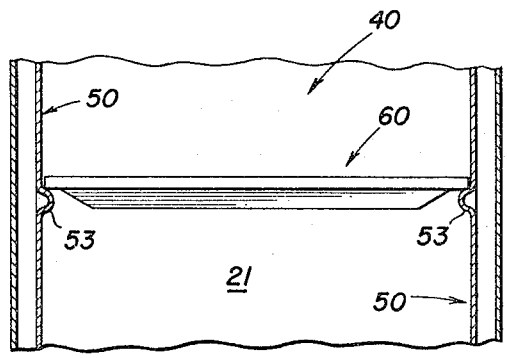
Figure 5:
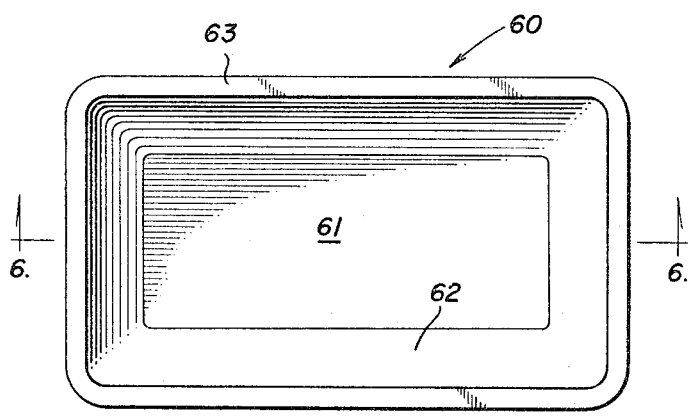
FIG. 5 is an enlarged plan view of the pan, as shown in FIG. 4.
Figure 6:
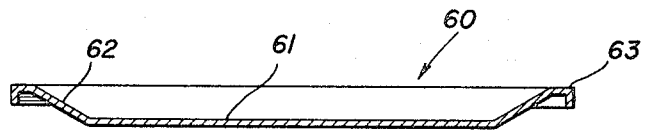
FIG. 6 is an enlarged longitudinal sectional view of the pan, this view being taken in the direction of the arrows along the line 6—6 in FIG. 5.

Referring now to FIGS. 4 to 6, inclusive, the side panels 50 may be employed removably to support a cooking device 60 in the oven cavity 21; which cooking device 60 may take the form of a shallow pan of rectangular configuration and including a substantially flat central portion 61, an upwardly and outwardly directed marginal flange 62 and a downwardly turned surrounding rim 63. When the pan 60 occupies its operative position in the oven cavity 21, the opposite end portions of the rim 63 engage the opposed projections 53 respectively carried by the side panels 50, so as to support the pan 60 in a substantially horizontal position. In its operative position, the pan 60 may be employed as a baking pan, a frypan, a cookie sheet, or the like, in carrying out cooking operations in the oven cavity 21 in a conventional manner.

The basic construction of the pan 60 is the same as that of each of the side panels 50, as previously described in conjunction with FIG. 3. Thus, the pan 60 comprises the steel body sheet, the upper and lower aluminum layers, and the upper resinous coating. In this case it is the upper side of the pan 60, and thus the interior or concave side thereof, that carries the resinous coating of the construction previously described. This arrangement is particularly advantageous in the pan 60, since the polytetrafluoroethylene coating carried by the side thereof that is in contact with the food being cooked in the oven cavity 21 positively insures ready release, without sticking, of the cooked food.

Of course, the pan 60 may be removed from the oven cavity 21, washed, and then returned into its operative position in the oven cavity, in an obvious manner.

The construction and arrangement of the oven 10 with the removable panels 40 and 50 and of the pan 60 are disclosed in the previously mentioned parent application of Raymond L. Reinert and Carl T. Fliss, Ser. No. 416,582, now Patent No. 3,241,545.

In making the side panel 50 in accordance with the method of the present invention, the same is first blanked from a steel sheet of suitable gauge (about 0.035″) and carrying on each side thereof a thin coating of aluminum, of a normal thickness of about 1 mil. The blank is then formed to the desired configuration by die action in a conventional manner to provide the basic structure of the panel 50, the body sheet 53 and the two aluminum coatings 54a and 54b respectively carried by the opposite sides thereof being illustrated in FIG. 3. Next the panel 50 is subjected to conventional cleaning, such, for example, as vapor degreasing. Alternatively, the panel 50 may be cleaned by soaking the same for about 1 minute in a conventional buffered alkaline bath at a temperature in the general range 160° F. to 180° F.; such a buffered alkaline bath may comprise a suitable aqueous solution of "Detrex No. 74." The panel 50 is then rinsed with the warm water at a temperature of about 150° F. for about ½ minute.

The panel 50 is then subjected to alkaline etching for about 20 to 30 seconds in a caustic bath at a temperature in the general range 160° F. to 180° F. This bath may comprise an aqueous solution of caustic soda, this bath containing about 1 ounce of caustic soda per gallon. The panel 50 is then rinsed with warm water at a temperature of about 150° F. for about ½ minute.

Next the panel 50 is dipped into an acid bath for the purpose of neutralizing any residual alkaline etch bath carried thereby, this acid bath being of the chromic acid-phosphoric acid type. Such a bath may comprise, for example, an aqueous solution of "Duorinse" that consists essentially of an aqueous solution of $CrO_3$ and $H_3PO_4$. The addition of about 500 cc. of this material to 250 gallons of water is productive of a suitable acid bath containing by weight about 1/40% of the two acids mentioned, with the chromic acid:phosphoric acid ratio being about 60:40. The panel 50, after dipping in the acid bath, is immediately force dried, without rinsing, in a current of hot air at about 200° F.

The foregoing preparation of the surface of the panel 50 comprises substantially conventional metal preparation steps; whereby the inner side of the body sheet 51 carrying the aluminum coating 54b is in readiness to receive the resinous coating 55, as illustrated in FIG. 3. In the application of this coating 55 a "Paasche" air gun is employed at an air pressure of 40 p.s.i.g.; and the composite coating 55 is applied in three distinct steps, as explained more fully below.

A first coating is applied to the prepared aluminum coating 54b in the form of a continuous substantially uniform layer having a thickness of about 0.4 mil, using the previously mentioned air gun. This first coating essentially comprises an emulsion in water of the polytetrafluoroethylene solids and wetting agents. This first coating is a prime coating and may consist of "Du Pont 851-204," also referred to as a "one-coat green" coating. This first coating is then cured for 15 minutes at 750° F. in an oven. Forced air infrared heat, etc., may also be used if desired.

A second coating is applied to the cured first coating in the form of a continuous substantially uniform layer having a thickness of about 0.4 mil, using the previously mentioned air gun. This second coating essentially comprises an emulsion in water of the polytetrafluoroethylene solids, wetting agents, and inorganic oxide coloring pigments, such as the oxides of chromium, iron, cobalt, nickel, etc. This second coating is an enamel coating and may consist of "Du Pont 851-221," also referred to as a "high build grey" coating. This second coating is then cured for 15 minutes at 750° F. in an oven. Forced air, infrared heat, etc., may also be used if desired.

A third coating is applied to the cured second coating in the form of a continuous substantially uniform layer having a thickness in the general range 0.5 to 1.0 mil, using the previously mentioned air gun. This third coating essentially comprises an emulsion in water of the polytetrafluoroethylene solids, a surfactant and a plasticizing agent. This third coating is a surface finishing coating and may consist of "Du Pont T-30," and a plasticizing agent selected from the class consisting of glycerol, ethylene glycol, propylene glycol, and dimethylsulfoxide. "T-30" essentially comprises an aqueous dispersion of polytetrafluoroethylene solids (about 60% by weight) and "Rohm & Haas Triton X-100" (about 5% by weight). "Triton X-100" essentially comprises alkyl aryl polyether alcohol. To the "T-30" about 7% to 10% (by weight) of the plasticizing agent is added; and specifically, glycerol is recommended, as a matter of simplicity and economy. This third coating is then cured for 15 minutes at 750° F. in an oven. Forced air, infrared heat, etc., may also be used if desired.

The second and third coatings constitute "wet coats" to maximize surface smoothness and finish of the composite coating 55 that results upon cooling, following the curing of the third coating, as described above. At this time the finished panel 50 is ready for use in the oven cavity 21, in the manner previously explained. The first, second and third coatings in FIG. 3 have been designated by the numerals 55a, 55b and 55c, respectively, the three coatings named providing the composite coating 55.

At this point it is noted that the inclusion of the plasticizing agent in the "T-30" material that is employed in the third coating is essential to the ultimate production of the composite coating 55 having the smooth and continuous and crack-free exposed surface of the character previously described. More particularly, if this plasticizing agent is omitted from the "T-30" material, the coating thus produced develops substantial "mud-cracks" therein during the early stages of the curing step following the application of the third coating upon the second coating, as described above. The exact mechanism of the plasticizing agent to prevent the formation of these "mud-cracks" is not understood, but the effect or end result is very pronounced. It is surmised that the wet or green "T-30" coating, containing no plasticizing agent, undergoes the loss of water at a very rapid rate early in the curing step, with the formation of the undesirable "mud-cracks" in the exposed surface of the cured resin. On the other hand, the wet or green "T-30" coating, containing the plasticizing agent, may undergo the loss of water at only a modest rate early in the curing step, without the formation of the undesirable "mud-cracks." This phenomenon suggests the possibility of an "humectant" mechanism, particularly since the discovered group of plasticizing agents includes the well known humectants glycerol, propylene glycol, ethylene glycol and dimethylsufoxide. However, this group of agents that may be added to the "T-30" material to achieve the present result have been referred to simply as "plasticizing" agents, for certainly these agents accomplish this function during the curing of the wet or green coating of "T-30" material. During the curing of the wet or green coating "T-30" material, the contained water and plasticizing agent is liberated and evaporated therefrom, so that the finished or final composite coating 55 consists essentially only of polytetrafluoroethylene. Thus, the plasticizing agent employed for the present purpose must be eliminated from the resin in the curing step, as explained above; whereby the plasticizing agent should not be subjected to degrading prior to elimination thereof, and should produce no carbonaceous residue in the cured resin.

Reviewing the resulting coating 55 thus produced, it is of substantially uniform thickness in the range ½ mil to 1½ mils, and normally about 0.8 mil. It is of composite construction, since in the production thereof the first coating described is a prime coating, the second coating described is an enamel coating, and the third coating described is a surface finished coating; whereby; the outer skin of the composite coating 55 is substantially 100% polytetrafluoroethylene and is thus substantially completely devoid of inorganic coloring pigments or binding compounds; which outer skin has a thickness of at least about 0.21 mil. It is this outer skin of substantially pure polytetrafluoroethylene and devoid of thin spots and having at least the 0.2 mil thickness that renders the composite coating 55 free of discoloration after long use in the environment of the oven cavity 21; and it is in this outer skin that "mud-cracks" develop incident to curing thereof, unless the third coating described that is productive of this outer skin contains the plasticizing agent, as described above. Thus, this composite coating 55 is critical to satisfactory operation of the panel 50 for the present purpose.

Of course, the rear panel 40 and the pan 60 are produced in a manner identical to that employed in the production of the side panel 50, as described above.

The construction and arrangement of the component elements of the side panel 50, as illustrated in FIG. 3 and as previously described, are very advantageous, by virtue of the inclusion of the aluminum layers 54a and 54b. More particularly, the aluminum layer 54a carried by the outer side of the side panel 50 protects the outer surface of the steel body sheet 53 against staining or rusting incident to cleaning of the side panel 50 with wash water; while the aluminum layer 54b carried by the inner side of the side panel 50 materially enhances the adhesion of the polytetrafluoroethylene coating 55 to the inner surface of the steel body sheet 53. Thus, in the side panel 50, bonding of the aluminum layers 54a and 54b to the adjacent opposite surfaces of the steel body sheet 53 is entirely conventional and metallurgical in character, as in all aluminized steel sheets obtained commercially; whereas, the bonding of the polytetrafluoroethylene coating 55 to the inner aluminum layer 54b is adhesive in character. In passing, it is mentioned that the resin "polytetrafluoroethylene" is also commonly referred to simply as "tetrafluoroethylene"; and, of course, this resin is generically termed a "fluorocarbon" resin.

In the commercial manufacture of aluminized steel sheet, it is conventional practice to provide a cold rolled steel body sheet (normally 1006 or 1008 and of drawing quality) of substantially the desired gauge. The steel body sheet is then cleaned and thereafter dipped into or passed through a molten bath of aluminum, so as to produce aluminum layers on the opposite sides thereof. This composite sheet is cold rolled to obtain intimate metallurgical bonding of the aluminum surface layers, smoothness of the exposed surfaces of the aluminum layers, and the desired gauge of the resulting aluminized sheet.

The above remarks with regard to the construction of the side panel 50 are also directly applicable to the construction of the pan 60, as previously explained.

Accordingly, each of the panels 40 and 50 and the pan 60 includes a metal body sheet carrying a relatively thick coating of polytetrafluoroethylene that is smooth and continuous and crack-free at the exposed surface thereof, whereby the same may be readily cleaned by washing in a simple and direct manner after removal thereof from the oven cavity 21 utilizing only wash water containing a suitable detergent.

In view of the foregoing it is apparent that there has been provided an improved process of producing on a substrate a unified adherent coating of polytetrafluoroethylene having a smooth surface devoid of cracks and blemishes.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The process comprising applying to a substrate a coating consisting essentially of an emulsion in water of substantially pure polytetrafluoroethylene solids and an humectant, said humectant generally comprising a compound selected from the group consisting of glycerol, propylene glycol, ethylene glycol and dimethylsulfoxide and being present in an amount from about 7% by weight to about 10% by weight of said emulsion, and curing said coating by heating the same for a short time interval at an elevated temperature, whereby upon cooling there is produced upon said substrate a unified adherent coating having a smooth surface devoid of cracks and blemishes.

2. The process comprising applying to a substrate a coating consisting essentially of an emulsion in water of substantially pure polytetrafluoroethylene solids and glycerol, said glycerol being present in an amount from about 7% by weight to about 10% by weight of said emulsion, and curing said coating by heating the same for a time interval of about 15 minutes at a temperature of about 750° F., whereby upon cooling there is produced upon said substrate a unified adherent coating having a smooth surface devoid of cracks and blemishes.

3. The process comprising providing a supporting sheet formed essentially of steel and carrying on a surface thereof an adherent layer formed essentially of aluminum, applying to said layer a coating comprising an emulsion in water of polytetrafluoroethylene solids and glycerol, said glycerol being present in an amount from about 7% by weight to about 10% by weight of said emulsion, and curing said coating by heating the same for a time interval of about 15 minutes at a temperature of about 750° F., whereby upon cooling there is produced upon said layer a unified adherent coating having a smooth surface devoid of cracks and blemishes.

4. The process comprising applying to a substrate a first coating comprising an emulsion in water of polytetrafluoroethylene solids, curing said first coating for a short time interval at an elevated temperature, applying to said cured first coating a second coating comprising an emulsion in water of polytetrafluoroethylene solids and inorganic oxide coloring pigments, curing said second coating for a short time interval at an elevated temperature, applying to said cured second coating a third coating comprising an emulsion in water of polytetrafluoroethylene solids and an humectant, said humectant generally comprising a compound selected from the group consisting of glycerol, propylene glycol, ethylene glycol and dimethylsulfoxide and being present in an amount from about 7% by weight to about 10% by weight of said emulsion, and curing said third coating for a short time interval at an elevated temperature, whereby upon cooling there is produced upon said substrate a unified adherent coating having a smooth surface devoid of cracks and blemishes.

5. The process comprising applying to a substrate a first coating comprising an emulsion in water of polytetrafluoroethylene solids, curing said first coating by heating the same for a time interval of about 15 minutes at a temperature of about 750° F., applying to said cured first coating a second coating comprising an emulsion in water of polytetrafluoroethylene solids and inorganic oxide coloring pigments, curing said second coating by heating the same for a time interval of about 15 minutes at a temperature of about 750° F., applying to said cured second coating a third coating comprising an emulsion in water of polytetrafluoroethylene solids and a humectant, said humectant generally comprising a compound selected from the group consisting of glycerol, propylene glycol, ethylene glycol and dimethylsulfoxide and being present in an amount from about 7% by weight to about 10% by weight of said emulsion, and curing said third coating by heating the same for a time interval of about 15 minutes at a temperature of about 750° F., whereby upon cooling there is produced upon said substrate a unified adherent coating having a smooth surface devoid of cracks and blemishes.

6. The process comprising applying to a substrate a first coating comprising an emulsion in water of polytetrafluoroethylene solids, said first coating as applied having a thickness of about 0.4 mil, curing said first coating for a short time interval at an elevated temperature, applying to said cured first coating a second coating comprising an emulsion in water of polytetrafluoroethylene solids and inorganic oxide coloring pigments, said second coating as applied having a thickness of about 0.4 mil, curing said second coating for a short time interval at an elevated temperature, applying to said cured second coating a third coating comprising an emulsion in water of polytetrafluoroethylene solids and a humectant, said humectant essentially comprising a compound selected from the group consisting of glycerol, propylene glycol, ethylene glycol and dimethylsulfoxide and being present in an amount from about 7% by weight to about 10% by weight of said emulsion, said third coating as applied having a thickness in the general range 0.5 mil to 1.0 mil, and curing said third coating for a short time interval at an elevated temperature, whereby upon cooling there is produced upon said substrate a unified adherent coating having a smooth surface devoid of cracks and blemishes, said unified coating having a thickness in the general range ½ mil to 1½ mils.

References Cited by the Examiner
UNITED STATES PATENTS

| | | | |
|---|---|---|---|
| 2,510,078 | 6/1950 | Compton et al. | |
| 2,540,962 | 2/1951 | Puppolo. | |
| 2,562,117 | 5/1951 | Osdal. | |
| 2,581,454 | 1/1952 | Sprung | 260—29.6 |
| 2,807,511 | 9/1957 | Fleming | 117—132 X |
| 2,979,418 | 4/1961 | Dipner. | |

ALFRED L. LEAVITT, *Primary Examiner.*

RALPH S. KENDALL, *Examiner.*